G. C. ANDREWS.
HEATING PLANT.
APPLICATION FILED APR. 6, 1908.

946,911.

Patented Jan. 18, 1910.
3 SHEETS—SHEET 1.

Witnesses:
L. L. Simpson
A. H. Opsahl

Inventor:
George C. Andrews
By his Attorneys
Williamson Merchant

G. C. ANDREWS.
HEATING PLANT.
APPLICATION FILED APR. 6, 1908.

946,911.

Patented Jan. 18, 1910.
3 SHEETS—SHEET 2.

Witnesses:
L. L. Simpson
A. H. Opsahl

Inventor:
George C. Andrews
By his Attorneys:
Williamson & Merchant

G. C. ANDREWS.
HEATING PLANT.
APPLICATION FILED APR. 6, 1908.

946,911.

Patented Jan. 18, 1910.
3 SHEETS—SHEET 3.

Witnesses:
L. L. Simpson
A. H. Opsahl.

Inventor:
George C. Andrews
By his Attorneys:
Williamson Merchant

UNITED STATES PATENT OFFICE.

GEORGE C. ANDREWS, OF MINNEAPOLIS, MINNESOTA.

HEATING PLANT.

946,911.   Specification of Letters Patent.   Patented Jan. 18, 1910.

Application filed April 6, 1908. Serial No. 425,322.

*To all whom it may concern:*

Be it known that I, GEORGE C. ANDREWS, a citizen of the United States, residing at Minneapolis, in the county of Hennepin and State of Minnesota, have invented certain new and useful Improvements in Heating Plants; and I do hereby declare the following to be a full, clear, and exact description of the invention, such as will enable others skilled in the art to which it appertains to make and use the same.

My invention has for its object to provide an improved heating plant, especially adapted for use in heating large buildings, such as flour mills or similar structures; and, to this end, it consists of the novel devices and combinations of devices hereinafter described and defined in the claim.

In this improved plant the air of the building is circulated by means of a fan, the dust and other impurities are removed therefrom by a spray of water, the surplus water is in part removed from the air by means of a so-called eliminator, the air is then further cooled by a cooling device made up of a multiplicity of coils or pipes to precipitate more of the moisture therefrom when this may be found desirable; and thereafter the air is subjected to a steam or hot water radiator or tempering device made up of a multiplicity of coils or pipes; and, after this has been done, the heated or properly tempered air may be given the proper humidity by means of another water spraying device.

The preferred form of the improved apparatus is illustrated in the accompanying drawings, wherein like characters indicate like parts throughout the several views.

Figure 1:
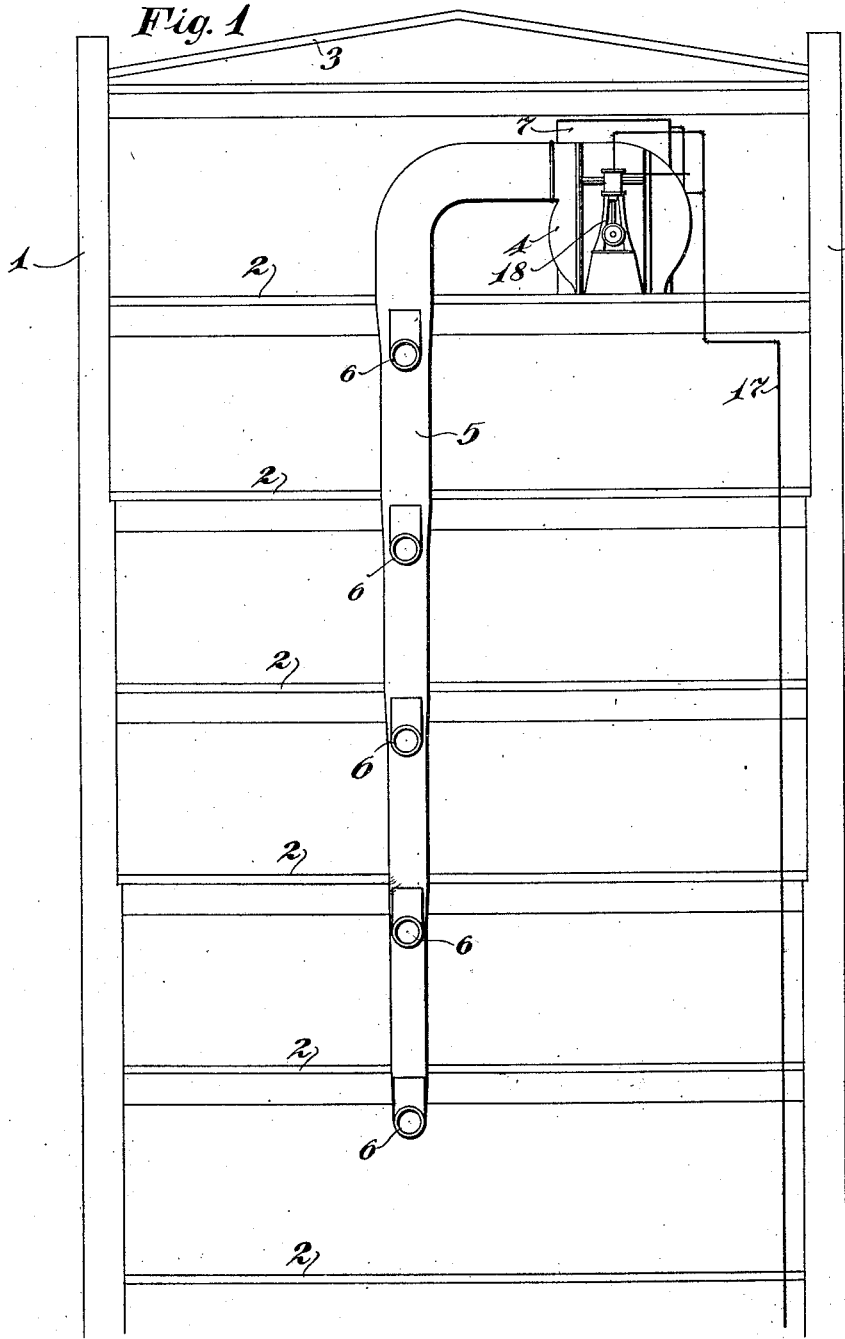
Figure 2:
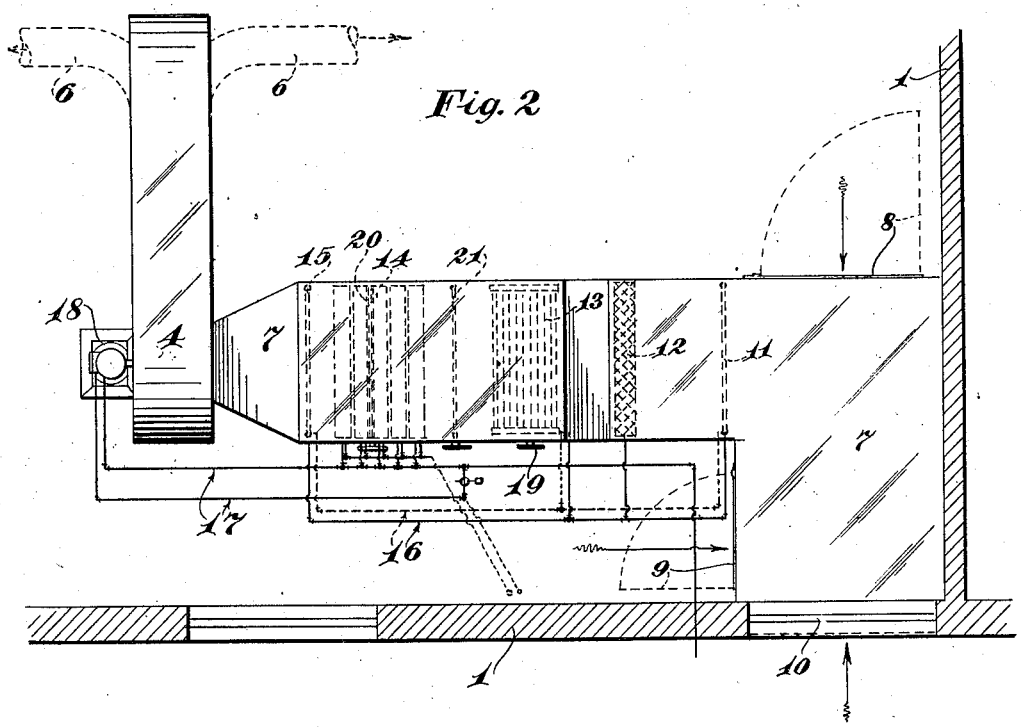
Figure 3:
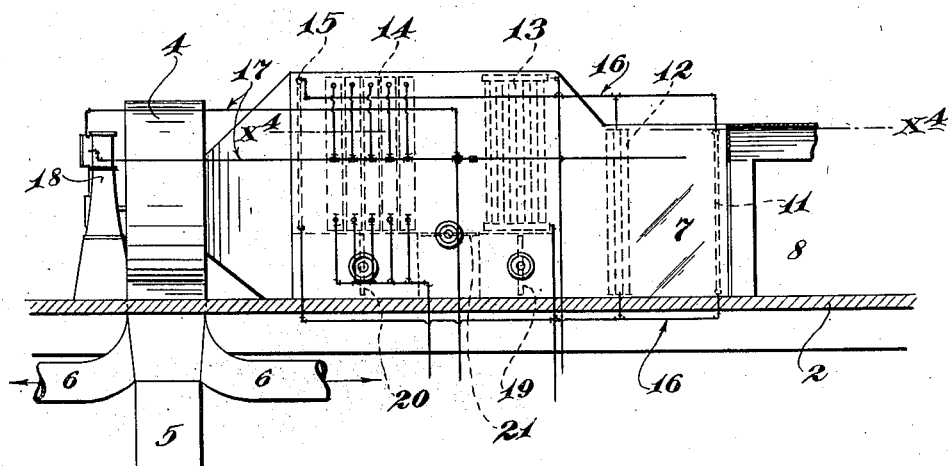
Figure 4:
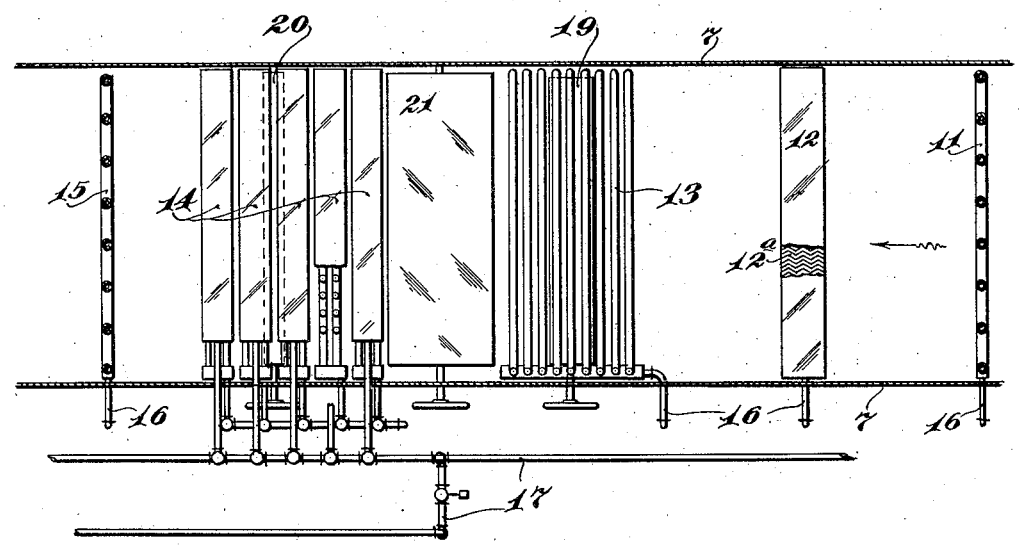
Figure 5:
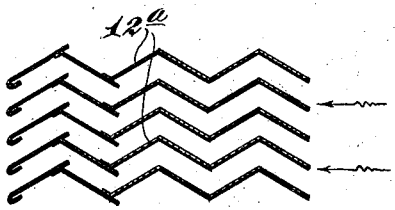

Referring to the drawings, Figure 1 is a diagrammatic view, partly in vertical section and partly in side elevation, illustrating the manner in which the heating plant is installed in a mill or other building, of several stories in height. Fig. 2 is a view chiefly in plan, but with some parts in section, showing the heating plant on a larger scale than in Fig. 1. Fig. 3 is a side elevation of the parts shown in Fig. 2. Fig. 4 is a horizontal section taken approximately on the line $x^4$ $x^4$ of Fig. 3, showing the parts on a larger scale than in Fig. 2, some parts being broken away; and Fig. 5 is a horizontal section taken through a portion of the so-called water eliminator and showing the parts on a much larger scale than in Fig. 4.

The numeral 1 indicates the walls, the numeral 2 the several floors and the numeral 3 the roof of a mill or similar building in which the heating plant is installed. All parts of the heating plant, except the air delivery tubes, are preferably placed in the upper story of the building. The heated air is, by means of a power driven fan 4, caused to travel downward through a main air delivery pipe 5 having lateral branches 6 that open at suitable points in the several stories of the building. In an installation of this kind the air displaced by the hot air positively forced to the several stories from the fan or the floor will find its way to the fan through various other floor openings, such as stairways, elevator shafts and the like; and, furthermore, in a flour mill of modern construction and equipment there is a strong natural draft from the lower toward the upper floors. All the air returning to the fan is, by suction from the fan, caused to travel through a large sheet metal casing or jacket 7 which, as shown, has inlet gates 8 and 9 located within the building and adapted to be opened up to a greater or less extent; and it also preferably has a fresh air inlet gate 10 adapted to be opened or closed more or less to admit fresh air from the exterior of the building.

In a flour mill, the air returning to the fan through this casing 7 will, of course, be laden, to a very considerable extent, with flour dust and other impurities; and, to remove these, the air is first carried through a heavy spray of water delivered from a spraying pipe 11 extended transversely of and located within the casing 7. A spray of water sufficient to remove all of the dust and impurities from the air will overcharge the air with moisture and, hence, the air is next passed through a so-called water eliminator 12 made up of a multiplicity of parallel upright zig zag plates 12ᵃ, best shown in detail in Fig. 5. A large amount of the surplus moisture contained in the air will, by the plates of this eliminator, be precipitated from the air. It will be necessary to still further dry the air and this is done by passing the air through a cooling device 13 made up of a multiplicity of coils or pipes through which the water is circulated. After the air has thus been cleaned and dried it is passed through a radiator or tempering device 14, the coils or conduits of which are heated, preferably by steam. After the air has thus been heated, if it be found too dry it may be given the proper humidity by a spray of water delivered thereto from a spraying pipe 15. The said eliminator 12, cooling device 13, radiator or tempering device 14 and spraying pipe 15, as well as the first noted spraying pipe 11, are all located within the casing or jacket 7. The said spraying pipes 11 and 15 and cooling device 13 are provided with suitable water supply or circulating pipe connections, diagrammatically illustrated in the drawings and indicated by the numeral 16. Steam is supplied to the coils of the radiator 14 by a system of pipe connections 17 which, as shown, also extend to an engine 18 which, in the plan illustrated, is employed to drive the rotating member of the fan 4. These water and steam connections, however, form no important part of my present invention and, hence, may be passed with the above brief notation.

By reference to Fig. 3 it will be noted that the cooling device 13 and the radiator 14 are both set up above the floor or bottom of the casing 7 and are spaced apart from each other. The passage below the cooling device 13 is adapted to be opened and closed by means of a pivoted gate 19, the passage below the radiator 14 is adapted to be opened and closed by a similar pivoted gate 20 and the passage between the bases of the said cooling device and radiator is adapted to be opened and closed by a third pivoted gate 21. When the said gates 19, 20 and 21 are set in their closed positions, shown in Fig. 3, all of the air passing through the casing 7 will be caused to pass both through the cooling device 13 and through the radiator 14. When the gates 19 and 21 are turned into opened positions, while the gate 20 is closed, part of the air will be permitted to pass under the cooling device 13, but all thereof will be caused to pass through the radiator 14. If the gates 20 and 21 be turned into opened positions while the gate 19 is closed, all of the air will be caused to pass through the cooling device 13, but part thereof will be permitted to pass under the radiator 14. When the gates 19 and 20 are both open, part of the air will be permitted to pass under both the cooling device 13 and radiator 14. These gates, therefore, afford means for varying the flow of the air so as to vary the actions of the cooling device and radiator on the air.

In hot weather air may be cooled by the plant above described, but when thus used cold water should be circulated through the coils or conduits of the so-called radiator or tempering device 14, as well as through the coils or pipes of the cooling device 13.

What I claim is:

In a plant of the kind described, the combination with a fan having an air discharge pipe opening into the several stories of a building, and a casing connected to said fan, of a spraying pipe, a water eliminator, an air cooling device for drying the air and a radiator, all located within said casing and operating in the order of sequence given upon the air drawn through said casing by said fan, and three air controlling gates in said casing, one located below said air cooling device, one located below said radiator, and one located between the bases of said air cooling device and radiator, substantially as described.

In testimony whereof I affix my signature in presence of two witnesses.

GEORGE C. ANDREWS.

Witnesses:
H. D. KILGORE,
MALIE HOEL.